May 13, 1952
A. QUAYLE
2,596,722
TORQUE CONVERTER BRAKE CONTROL
Filed May 15, 1947
2 SHEETS—SHEET 1
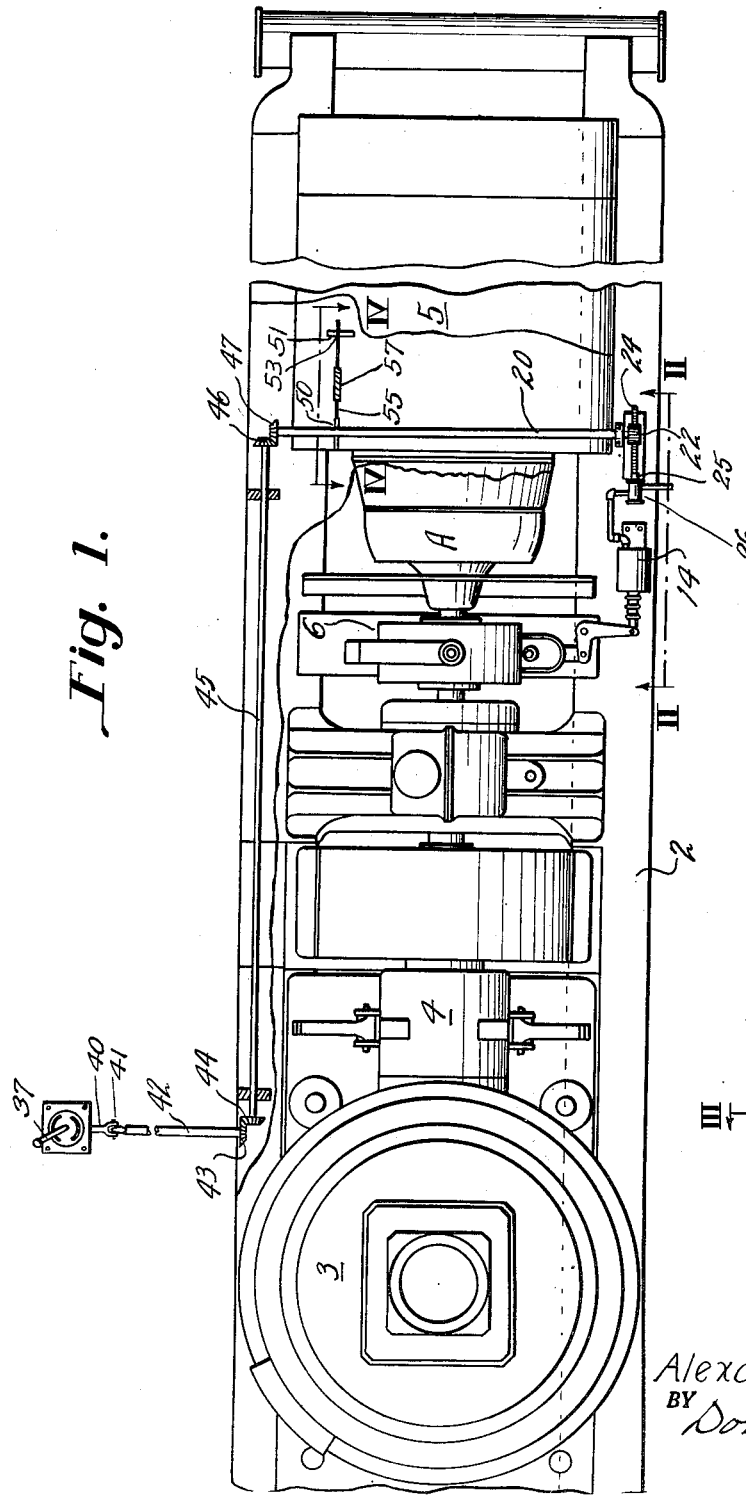
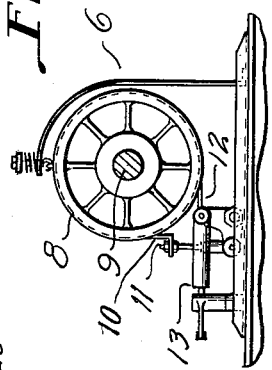
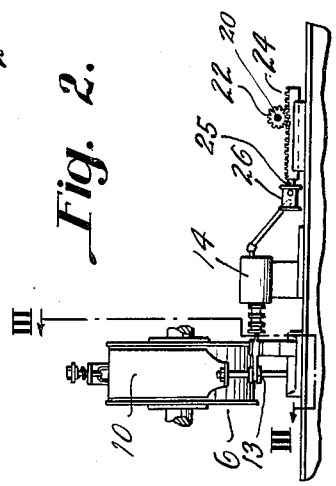
INVENTOR.
Alexander Quayle
BY Donald G. Dalton
HIS ATTORNEY May 13, 1952  A. QUAYLE  2,596,722
TORQUE CONVERTER BRAKE CONTROL
Filed May 15, 1947  2 SHEETS—SHEET 2

INVENTOR.
Alexander Quayle
BY Donald G. Dalton
HIS ATTORNEY

Patented May 13, 1952

2,596,722

UNITED STATES PATENT OFFICE 2,596,722

TORQUE CONVERTER BRAKE CONTROL

Alexander Quayle, Oil City, Pa., assignor to United States Steel Company, a corporation of New Jersey Application May 15, 1947, Serial No. 748,306

9 Claims. (Cl. 192—3)

This invention relates to a unitary throttle and brake control which, while not limited thereto, is well suited to the application of such a control to the torque converter of oil well rotary drilling units.

The operation of various types of heavy massive equipment requires the very close attention of the operator and the use of controls which are fairly sensitive. In recent years much heavy and massive equipment, such, for example, as oil well drilling units, have been so constructed as to constitute what might be considered a unit wherein there is provided a control station where the operator takes his position. From this station the operator controls the throttle of the prime mover which may be a diesel engine, a steam engine or the like, and the operation of a brake interposed between the prime mover and the machine normally driven thereby.

It is among the objects of the present invention to provide a unitary throttle and brake control by means of which the operator can efficiently control the speed of the prime mover by manipulation of the throttle and the operation of a brake associated with the torque converter driven by the prime mover.

Another object is to control the speed of the prime mover throughout the range from wide open throttle to idling speed without the application of the brake, while at the same time permitting an additional movement of the control actuating member beyond the position to which it is moved to permit the prime mover to run at idling speed and also to operate means to apply the brake when such brake application is desired while the prime mover is still idling.

Another object is to provide means which by the sense of touch will indicate to the operator that the throttle operating means has reached the position to cause the prime mover to reduce to idling speed and that the brake control means has reached a position to which it is in readiness to cause an application of the brake Still another object is the attainment of the foregoing by the provision of an inexpensive combination of interdependent elements, simple and easy to manufacture and install and which, at the same time, are durable and practically foolproof in service.

The above and further features which are made available by the present invention will be more fully apparent from a consideration of the following detailed disclosure and claims when considered in conjunction with the accompanying drawings, in which:

Figure 1 is a plan of an oil well rotary drilling unit embodying the present invention;

Figure 2 is an elevational view on the line II—II of Figure 1;

Figure 3 is a sectional elevation taken on the line of III—III of Figure 2;

Figure 4:
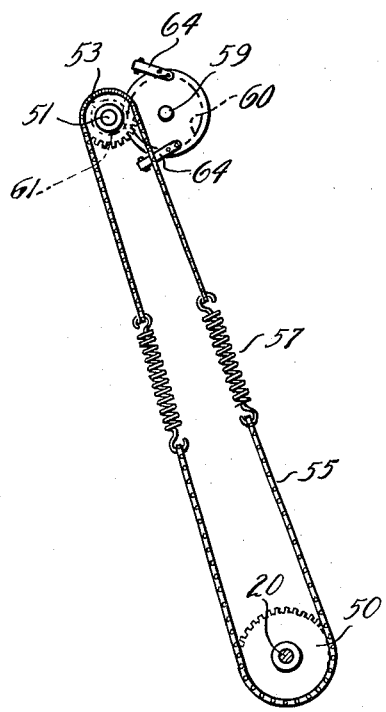
Figure 4 is an elevation illustrating the connection between the means which control the brake and the throttle.
Figure 5:
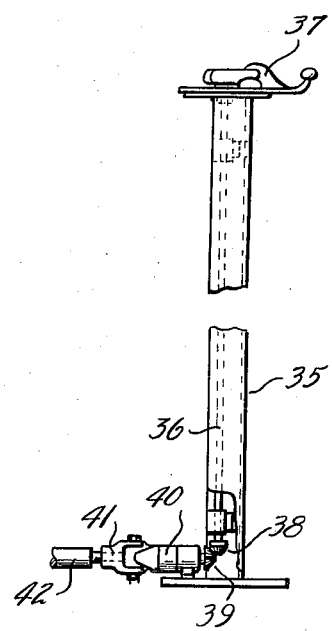
Figure 5 is a fragmentary elevation of a housed vertical shaft to the upper end of which is secured the operating handle of the throttle and brake control, together with the connecting means at the lower end of said shaft.

Referring to the embodiment of the invention illustrated by the drawings, the numeral 2 generally designates the frame or base of a rotary drilling unit, including a rotary table 3, pinion shaft assembly 4, a prime mover 5 and a torque converter A, a vacuum actuated brake 6 being provided for braking the output shaft of the torque converter. The brake 6 comprises a brake drum 8 which is keyed or otherwise secured to the shaft 9 of the torque converter A. Around the brake drum 8 there is disposed a brake band 10 having one end fixed as shown at 11 while the other end is connected to an operating linkage 13, which is in turn connected to a conventional vacuum cylinder 14.

A shaft 20 extends crosswise of the frame or base 2 and is journalled for rotation thereon as indicated in Figure 1. One end of the shaft 20 is disposed adjacent the vacuum cylinder 14 and has secured thereto a gear 22 which meshes with a slidable rack 24. The movement of this rack 24 towards the vacuum cylinder 14 causes the rack to push an actuating pin of the vacuum valve 26 which controls the vacuum cylinder 14. The opening of this vacuum valve 26 causes the brake band 10 to grip the brake drum 8 and thereby apply a braking force to thus retard the speed of the output shaft of the torque converter.

The chief function of the brake on the unit shown is to absorb the light drag of the torque converter A when the engine is running at its idling speed.

The present invention contemplates an arrangement wherein a slight additional movement of the common actuator for the throttle and brake beyond the idling position will cause the application of the brake, i. e., move the rack 24 to push the valve pin 25 to open the vacuum valve 26 and thereby permit the vacuum of the internal combustion engine intake manifold to act in the vacuum cylinder 14 and thus cause the brake band 10 to exert a braking force on the brake drum 8. This result is obtained by a combination of elements which will be more fully described immediately hereinafter.

At the control station there is provided a vertical tube 35 within which there is journalled a rotatable rod 36, whose upper end projects beyond the end of the tube 35 and has secured thereto an actuator element 37. To the lower end of the vertical rotatable rod 36 there is secured a bevel gear 38 which meshes with a bevel gear 39 secured to a short shaft 40 which is flexibly connected, as at 41, to another shaft 42. The extended end of the shaft 42 carries a bevel gear 43 which meshes with the bevel gear 44 shown at the left end of a shaft 45 in Figure 1, which is journalled on, and extends longitudinally of, the frame or base 2. The right end of the shaft 45, as shown in Figure 1, carries a bevel gear 46 which meshes with a bevel gear 47 on the adjacent end of the cross shaft 20. As before stated, the shaft 20 also carries a spur gear 22 which meshes with the slidable valve pin actuating rack 24.

Referring to Figures 1 and 4, the shaft 20 has a sprocket 50 secured thereto. A shaft 51 is journalled above in parallelism with the shaft 20 and carries a sprocket 53 which rotates therewith. The two sprockets 50 and 53 are connected by a chain 55. Each of the two opposite longitudinally extending reaches of the chain 55 reeved about the sprockets 50 and 53 is interrupted about midway between the sprockets, as shown in Figure 4, and connected together by respective springs 57 to permit an overtravel later more fully described. As shown in Figure 4, a rotatable rod 59 operates a conventional butterfly valve (not shown) of the carburetor for engine 5 and a gear 60 is secured to this rotatable rod. The gear 60 meshes with a pinion 61 which may be secured to either the shaft 51 or the side of the sprocket 53. In either case, the rotation of the sprocket 53 (through the chain 55) will cause the rotation of the gear 61 to cause the butterfly valve actuating rod 59 to rotate to thereby increase or retard the speed of the engine. Two stops 64 are provided to limit the rotation of the gear 60 and the butterfly valve actuating rod 59 to either the "idle" or "wide open" throttle positions.

After the butterfly valve actuating rod 59 has reached engine idling position and one of the stops 64 prevents its further rotation, additional rotation of the sprocket 50 on the shaft 20 which controls the operation of the brake is permitted by reason of the fact that one of the springs 57 expands and the other contracts. These springs 57 thus allow for an overtravel of the operating handle 37 at the control station beyond the engine idling position. The necessity for stretching one of the springs 57 and compressing the spring (not shown) within the vacuum valve 26, gives a definite feel of increasing resistance to the movement of the handle 37, and thus by the sense of touch serves to notify the operator that he has passed the engine idling position and is starting to apply the vacuum brake.

While I have shown and described one specific embodiment of my invention, it will be understood that I do not wish to be limited exactly thereto, since various modifications may be made without departing from the scope of my invention as defined in the following claims.

I claim:

1. In a rotary drilling unit having a prime mover, a torque converter connected to said prime mover, a pinion shaft assembly connected to said torque converter, a rotary table connected to said pinion shaft assembly, and a brake on said pinion shaft assembly for absorbing the drag of said torque converter when said prime mover is idling, the combination with said prime mover and said brake of an improved control mechanism comprising a first rotatable shaft, means operatively connecting said first shaft and said brake, a second rotatable shaft parallel to said first shaft, means operatively connecting said second shaft and said prime mover, stop means limiting the extent of rotation of said second shaft, one of the limits of its rotation being the position at which said prime mover idles, chain and sprocket means connecting said first and second shafts, resilient means in said chain and sprocket means allowing said first shaft to rotate beyond the limits which said stop means allow said second shaft to rotate, rotation of said first shaft after said second shaft reaches the idling position applying said brake, and manual means for rotating said first shaft.

2. In a rotary drilling unit having a prime mover, a torque converter connected to said prime mover, a pinion shaft assembly connected to said torque converter, a rotary table connected to said pinion shaft assembly, and a brake on said pinion shaft assembly for absorbing the drag of said torque converter when said prime mover is idling, the combination with said prime mover and said brake of an improved control mechanism comprising a first rotatable shaft, means operatively connecting said first shaft and said brake, a second rotatable shaft parallel to said first shaft, means operatively connecting said second shaft and said prime mover, stop means limiting the extent of rotation of said second shaft, one of the limits of its rotation being the position at which said prime mover idles, sprockets on said first and second shafts, a chain drive connecting said sprockets for rotating said second shaft on rotation of said first shaft, springs in said chain drive allowing said first shaft to rotate beyond the limits which said stop means allow said second shaft to rotate, rotation of said first shaft after said second shaft reaches the idling position applying said brake, and manual means connected with said first shaft for rotating the shafts.

3. In a rotary drilling unit having a variable speed engine, a torque converter connected to said engine, a pinion shaft assembly connected to said torque converter, a rotary table connected to said pinion shaft assembly, a vacuum operated brake on said pinion shaft assembly for absorbing the drag of said torque converter when said engine is idling, and a valve for applying and releasing said brake, the combination with said engine and said valve of an improved control mechanism comprising a first rotatable shaft, means operatively connecting said first shaft and said valve, a second rotatable shaft parallel to said first shaft, means operatively connecting said second shaft and said engine to regulate the engine speed, stop means limiting the extent of rotation of said second shaft, one of the limits of its rotation being the position at which said engine idles, chain and sprocket means connecting said first and second shafts, resilient means in said chain and sprocket means allowing said first shaft to rotate when said stop means prevents rotation of said second shaft, continued rotation of said first shaft after said second shaft reaches its idling position actuating said valve to apply said brake, and manual means for rotating said first shaft.

4. In a rotary drilling unit having a variable speed engine, a torque converter connected to said engine, a pinion shaft assembly connected to said torque converter, a rotary table connected to said pinion shaft assembly, a vacuum operated brake on said pinion shaft assembly for absorbing the drag of said torque converter when said engine is idling, and a valve for applying and releasing said brake, the combination with said engine and said valve of an improved control mechanism comprising a first rotatable shaft, rack and pinion means operatively connecting said first shaft and said valve for operating said valve by rotation of said first shaft, a second rotatable shaft parallel to said first shaft, means operatively connecting said second shaft and said engine for regulating the engine speed by rotation of said second shaft, stop means limiting the extent of rotation of said second shaft, one of the limits of its rotation being the position at which said engine idles, sprockets on said first and second shafts, a chain drive connecting said sprockets for rotating said second shaft on rotation of said first shaft, springs in said chain drive allowing said first shaft to rotate when said stop means prevents rotation of said second shaft, continued rotation of said first shaft after said second shaft reaches its idling position actuating said valve to apply said brake, and manual means for rotating said first shaft.

5. A rotary drilling unit comprising a prime mover, a torque converter connected to said prime mover, a pinion shaft assembly connected to said torque converter, a rotary table connected to said pinion shaft assembly, a brake on said pinion shaft assembly for absorbing the drag of said torque converter when said prime mover is idling, a first rotatable shaft operatively connected to said brake for applying and releasing said brake, a second rotatable shaft parallel to said first shaft and operatively connected to said prime mover for regulating the speed of said prime mover, stops limiting the extent of rotation of said second shaft, one of the limits of its rotation being the position at which said prime mover idles, chain and sprocket means connecting said first and second shafts, resilient means in said chain and sprocket means allowing said first shaft to rotate beyond the limits which said stops allow said second shaft to rotate, rotation of said first shaft after said second shaft reaches the idling position applying said brake, and manual means for rotating said first shaft.

6. A rotary drilling unit comprising a prime mover, a torque converter connected to said prime mover, a pinion shaft assembly connected to said torque converter, a rotary table connected to said pinion shaft assembly, a brake on said pinion shaft assembly for absorbing the drag of said torque converter when said prime mover is idling, a first rotatable shaft operatively connected to said brake for applying and releasing said brake, a second rotatable shaft parallel to said first shaft and operatively connected to said prime mover for regulating the speed of said prime mover, stops limiting the extent of rotation of said second shaft, one of the limits of its rotation being the position at which said prime mover idles, sprockets on said first and second shafts, a chain drive connecting said sprockets for rotating said second shaft on rotation of said first shaft, springs in said chain drive allowing said first shaft to rotate beyond the limits which said stops allow said second shaft to rotate, rotation of said first shaft after said second shaft reaches the idling position applying said brake, and manual means connected with said first shaft for rotating the shafts.

7. A rotary drilling unit comprising a variable speed engine, a torque converter connected to said engine, a pinion shaft assembly connected to said torque converter, a rotary table connected to said pinion shaft assembly, a vacuum operated brake on said pinion shaft assembly for absorbing the drag of said torque converter when said engine is idling, a valve for applying and releasing said brake, a first rotatable shaft operatively connected with said valve for controlling application of said brake, a second rotatable shaft parallel to said first shaft and operatively connected with said engine for regulating the engine speed, stops limiting the extent of rotation of said second shaft, one of the limits of its rotation being the position at which said engine idles, chain and sprocket means connecting said first and second shafts, resilient means in said chain and sprocket means allowing said first shaft to rotate when said stops prevent rotation of said second shaft, continued rotation of said first shaft after said second shaft reaches the idling position actuating said valve to apply said brake, and manual means for rotating said first shaft.

8. A rotary drilling unit comprising a variable speed engine, a torque converter connected to said means, a pinion shaft assembly connected to said torque converter, a rotary table connected to said pinion shaft assembly, a vacuum operated brake on said pinion shaft assembly for absorbing the drag of said torque converter when said engine is idling, a valve for applying and releasing said brake, a first rotatable shaft, a rack and pinion operatively connecting said first shaft and said valve for operating said valve by rotation of said first shaft, a second rotatable shaft parallel to said first shaft and operatively connected with said engine for regulating the engine speed, stops limiting the extent of rotation of said second shaft, one of the limits of its rotation being the position at which said engine idles, sprockets on said first and second shafts, a chain drive connecting said sprockets for rotating said second shaft on rotation of said first shaft, springs in said chain drive allowing said first shaft to rotate when said stops prevent rotation of said second shaft, continued rotation of said first shaft after said second shaft reaches the idling position actuating said valve to apply said brake, and manual means for rotating said first shaft.

9. A drive unit comprising a variable speed engine, a torque converter connected to said engine and having an output shaft, a brake on said output shaft for absorbing the drag of said torque converter when said engine is idling, a first rotatable control shaft operatively connected to said brake for applying and releasing said brake, a second rotatable control shaft parallel to said first control shaft and operatively connected to said engine for regulating the speed of said engine, stops limiting the extent of rotation of said second control shaft, one of the limits of its rotation being the position at which said engine idles, sprockets on said first and second control shafts, a chain drive connecting said sprockets for rotating said second control shaft on rotation of said first control shaft, springs in said chain drive allowing said first control shaft to rotate beyond the limits which said stops allow said second control shaft to rotate, rotation of said first control shaft after said second control shaft reaches the idling position applying said brake, and manual means connected with said first control shafts for rotating the control shafts.

ALEXANDER QUAYLE.

REFERENCES CITED

The following references are of record in the file of this patent:

UNITED STATES PATENTS

| Number | Name | Date |
|---|---|---|
| 594,946 | Grossman | Dec. 7, 1897 |
| 1,703,860 | Belitz | Mar. 5, 1929 |
| 1,902,802 | Hobbs | Mar. 21, 1933 |
| 2,102,755 | Sinclair | Dec. 21, 1937 |
| 2,350,137 | Banker | July 11, 1944 |